United States Patent [19]

Ollendick

[11] 4,047,085

[45] Sept. 6, 1977

[54] METHOD AND APPARATUS FOR CONTROLLING A WEB HANDLING DEVICE

[75] Inventor: Gary B. Ollendick, Chicago, Ill.

[73] Assignee: Teletype Corporation, Skokie, Ill.

[21] Appl. No.: 662,781

[22] Filed: Mar. 1, 1976

[51] Int. Cl.$^2$ .............................................. G05B 19/28

[52] U.S. Cl. .................................... 318/601; 318/603; 101/181; 197/127 R

[58] Field of Search ........................ 318/601, 602, 603; 101/181; 197/127 R

[56] References Cited

U.S. PATENT DOCUMENTS

| | | | |
|---|---|---|---|
| 3,833,843 | 9/1974 | Bossons | 318/600 X |
| 3,974,432 | 8/1976 | Thompson | 318/603 X |
| 3,997,828 | 12/1976 | Bottcher | 318/603 |

*Primary Examiner*—B. Dobeck
*Attorney, Agent, or Firm*—W. K. Serp; M. Pfeffer

[57] ABSTRACT

A circuit for controlling a graphic display printer wherein a paper sheet is wrapped about a rotating drum and maintained in place thereon by a vacuum. The length of the paper sheet is slightly longer than the circumference of the drum and thus defines a tangentially projecting flap. A sensor detects passage of the flap and in response to the initial detection, a counter is started having a cycle corresponding to one rotation of the drum. Selected states of the counter are digitally compared to the output of the flap sensor. After the rotational position of the flap has been determined twice for each of three successive drum revolutions, a paper validation signal is generated indicating that the paper is properly wrapped about and rotating with the drum. In response to the validation signal, printing is started. The circuit also includes means for preventing writing on the flap by correctly locating the copy with respect to top of paper and for maintaining a straight, first, print line irrespective of the characteristics of the paper edge or its positional sensing variations.

19 Claims, 6 Drawing Figures

MODULUS "2150" COUNTER
$Q_0 - Q_{11}$
MR
A
18
42
40
78
80
82
F
44
26
MOD. 3 COUNTER
Q
$\bar{Q}$
MR
E
83
PRINTER OPERATIONAL DELAY
46
74
54
56
58
86
DECODE "64"
DECODE "256"
DECODE "2048"
DECODE "1165"
40
84
32
62
68
90
88
87
S R
FLAP DESIRED FLIP-FLOP
60
64
66
S R
FLAP ABSENT FLIP-FLOP
DECODE "1172"
R
Q
T
F. F.
C
D
70
74
92
28
94
76
CLOCK OUT
DATA OUT
FIFO
DATA IN
CLOCK IN
72
98
96
INCOMING DATA

METHOD AND APPARATUS FOR CONTROLLING A WEB HANDLING DEVICE

FIELD OF THE INVENTION

This invention generally relates to a control circuit for a web handling apparatus and more particularly to a control circuit for detecting a desired paper condition in a graphic printer.

BACKGROUND OF THE INVENTION

Various graphic printers have been described wherein a sheet of paper is positioned on a rotating drum and maintained in place by means of a vacuum created within the drum. A controlled ink stream is directed at the paper, printing a desired pattern printed thereon. U.S. Pat. Application No. 606,954, filed Aug. 22, 1975 by Hauser et al. and entitled "Paper Handling in Graphic Printer" having a common assignee with this application, describes such an arrangement. As shown in this application, the paper is carried on an apertured platen drum which is rotated past a slowly moving print head so as to raster scan from top to bottom and from left to right over the surface of the paper. To facilitate insertion and removal of the paper, a shroud is placed very close to the cylindrical surface of the drum and during insertion, guides the paper into close proximity with the vacuum platen. An exit door is provided in the shroud, at a convenient location, to permit the paper to exit from the drum once the vacuum has been released. The size of the drum is made such that its circumference is slightly less than the length of the paper so as to provide overlap of the top and bottom edges of the paper. A light beam, directed tangential to the platen, is interrupted by the flap during each revolution of the drum which condition is sensed by a photocell. Such a flap sensor is described in U.S. Patent Application Ser. No. 606,959 filed Aug. 22, 1975 by Sokolowski and entitled "Paper Overlap Edge Sensor" having a common assignee with this application.

A particular requirement of the previously described arrangement is that the paper should be securely positioned upon the drum before printing is started so as to maintain line registration throughout printing. It will be appreciated that should slippage occur between the paper and the drum during printing, which generally occurs as a result of print initiation before proper paper positioning is obtained, the resulting print will be blurred and unacceptable. Further, the paper sensing circuitry should be such as to ignore false paper conditions which might occur due to mishandling of the paper such as partially inserting and then removing the paper from the drum or holding one end of the paper while allowing the remaining end to rest on the drum. Should such situations be interpreted as valid paper conditions by the printer, the ink jet would be directed at the drum resulting in ink being drawn into the vacuum system and deposited throughout the apparatus which situation, it will be appreciated, is extremely undesirable. Additionally, not only should the paper sensing circuit be immune to operator interference, but it should also correctly reference the start of message to the top paper edge. Further, although the initial start of the print should be referenced to the top edge of the paper, continued referencing of each raster scan to the paper edge can result in copy distortion due to paper edge and/or flap sensing variations. Thus, continued start of print referencing to the flap sensor produces a copy wherein the print lines exhibit a wave effect depending on system interpretation of the paper edge. The illustrated embodiment references the start of copy to the top of the paper thereby accurately centering the print on the paper; however, subsequent raster scans are referenced to the position of the drum thus avoiding line registration errors introduced by variations in the paper edge.

SUMMARY OF THE INVENTION

Described is a control circuit for sensing the condition of a web wrapped about a rotating drum wherein the web carries a positional indicator. A sensor is positioned adjacent the drum and serves to sense the passage of the web indicator and generates a series of indicator signals in response thereto. Generating means are described responsive to a selected one of the indicator signals for generating a first series of positional signals which correspond to subsequent desired rotational positions of the indicator carried by the web. A first comparator is described for comparing the occurrance of at least one of the indicator signals with at least one of the positional signals so as to ascertain whether the web indicator has rotated by the desired amount since the selected indicator signal.

Further, the position signal generating means includes means for generating a second series of positional signals offset from the first series and corresponding to subsequent non-desired rotational positions of the web indicator. A second comparator compares the web indicator signal with at least one of the non-desired positional signals so as to ascertain the absence of the web indicator at the indicator sensor.

The position signal generating means is described as being in the form of a counter which starts in response to a selected indicator signal and is advanced in response to a clocking signal related to the drum rotation. The first and second positional signals relate to selected counter states.

Additionally, described is a method for controlling the writing of information upon a paper disposed upon a rotating drum. The presence of the paper flap is sensed during each rotation of the drum and a signal generated when the flap is initially sensed. Subsequent positions of the flap are compared with signals corresponding to anticipated subsequent positions of the flap to determine whether the paper is rotating with the drum.

It is a main object of this invention to provide a method and apparatus for controlling a web handling apparatus wherein the web is carried upon a rotating drum. It is a further object of this invention to provide a paper control circuit for a graphic printer which assures correct location of the print on the paper. Other objects and advantages of the invention will be more readily appreciated after reference to the following description and accompanying drawings wherein:

DESCRIPTION OF THE ILLUSTRATED EMBODIMENT

General

Figures 1, 1A:
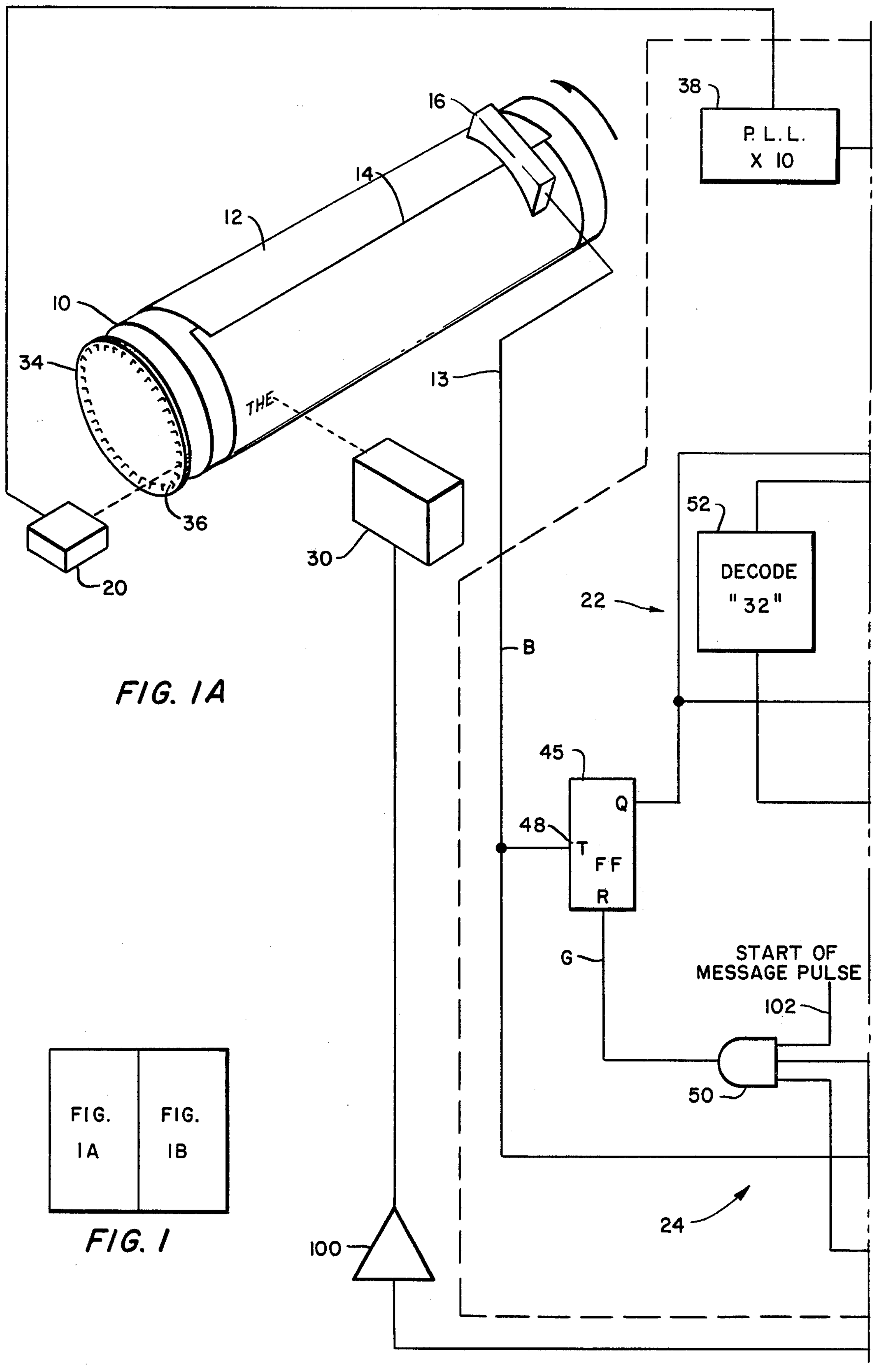
FIG. 1, which consists of FIGS. 1A and 1B, is a pictorial and schematic diagram of a control system for a graphic display printer including certain features of this invention.
Figure 1B:
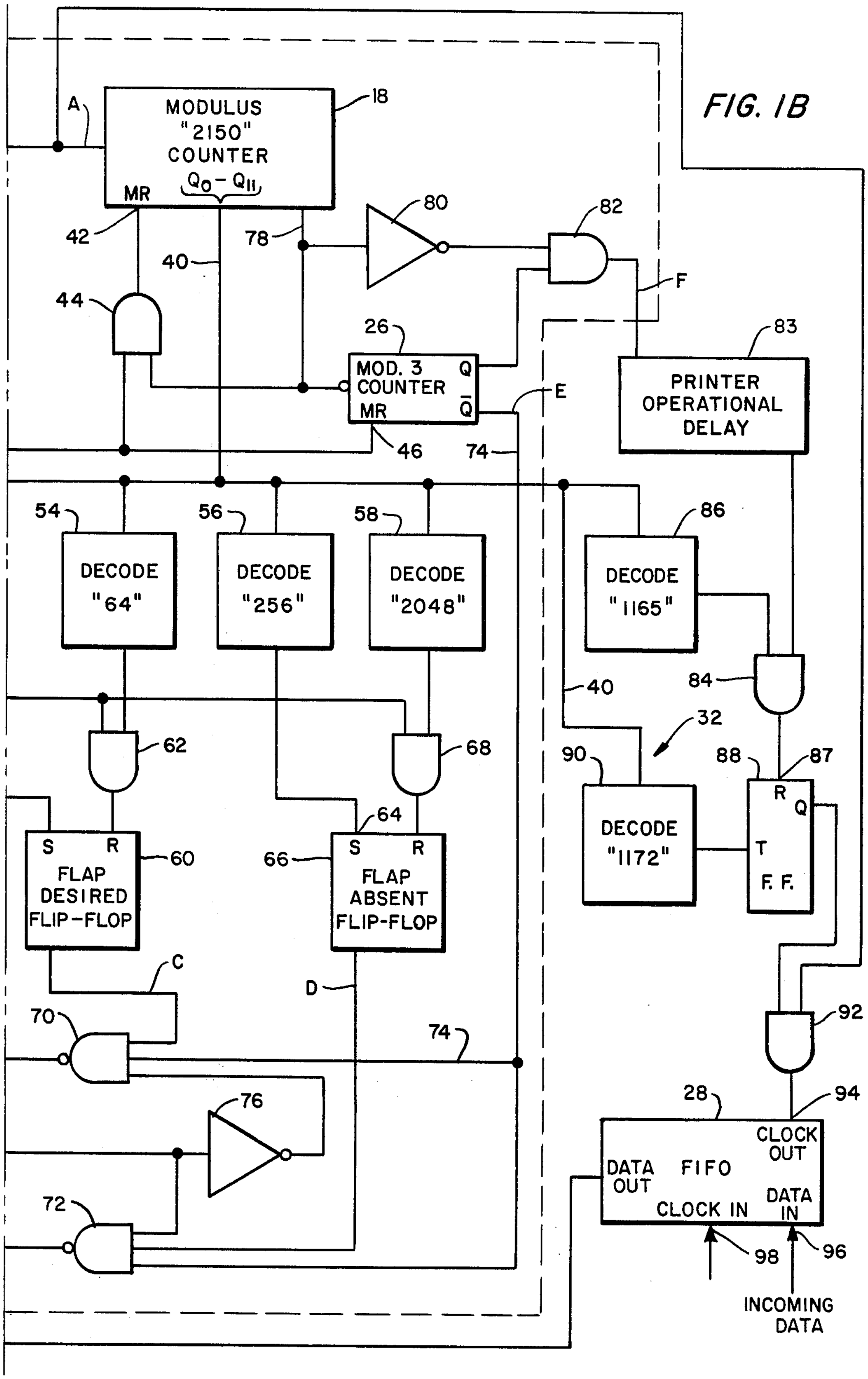

Generally, the illustrated apparatus includes a vacuum drum 10 about which a web in the form of a sheet of paper 12 is wrapped. The paper 12 is slightly longer than the circumference of the drum 10 and defines an overlapping flap 14. It should be noted that due to the normal stiffness of the paper 12, the plane of the flap 14 is tangent to the surface of the drum 10. A sensor 16 detects the passage of the flap 14 and in response to an initial flap signal from the sensor 16, a sampling counter 18 is enabled. The counter 18 is advanced in response to the output of a pulse generator 20 driven with the drum 10 by means, not shown. Thus, the state of the counter unit 18 corresponds to the position of the drum 10 with the initial flap detection serving as the starting reference. Selected states of the counter 18 are decoded by a decoder unit 22 and the output of the flap sensor 16 is digitally compared by a comparator 24 during a portion of the drum 10 revolution whereat detection of the flap 14 is anticipated as well as during a period of the drum revolution whereat the flap 14 and sensor 16 are out of registration. The repetition of such a valid condition for three consecutive revolutions advances a paper validation counter 26 which allows certain mechanical printer operations to be performed, after which, through decoding means 32 the clock pulses from the pulse generator 20 are raised in frequency and are allowed to pass to the clock output of a first in first out (FIFO) buffer storage 28, which is loaded by an outside signal source. The data information from the FIFO 28 is fed to a printing means 30 which, in response to the buffer output signal, deposits ink on the paper 12 thus printing the desired copy. Additionally, decoding means 32 are described for both starting and interrupting the output clocking of information to the writing head 30 during registration of the printing means 30 and paper flap 14 so as to center the copy on the paper 12. Since the output of information from the FIFO 28 to the printing means 30 is controlled by decoding means 32, the location of the print on the paper 12 after initial positioning with respect to the flap 14 is determined by decoded states of counter 18. In this way variations in the edge of the paper and its sensing are not reflected in the copy.

Detailed

With particular reference to FIG. 1, the vacuum drum 10 carries the paper 12 wrapped therearound with the bottom or trailing edge of the paper slightly overlapping the top edge. It will be appreciated that at the overlap, the outer edge 14 of the paper will not be subjected to the vacuum created within the drum and therefore will follow its natural contour. As mentioned, at this point the plane of the paper is tangent to the surface of the drum forming an indicator for referencing the paper 12 position with respect to the drum 10. A motor, not shown, drives the drum through a suitable gearing arrangement at a high rotational speed as illustrated in the aforecited Hauser reference, As the drum 10 rotates, the flap 14 interrupts the flap sensor 16 which includes a light source and a photo detector and provides an output signal for each flap passage. Thus for each revolution of the drum 10, the flap 14 actuates the sensor for a finite portion of the drum's revolution. A suitable sensor for use in the illustrated embodiment is described in the previously referenced Sokolowski application. The writing means 30 is positioned to move in a direction parallel to the axis of the drum 10 and is suitably geared to the drive system of the drum by means not shown so that as the drum rotates, the printing means 30 slowly moves across the paper 12, printing the desired pattern thereon. The printing means 30 is preferably of an ink jet type wherein a stream of ink drops are directed to and then selectively deposited upon the paper 12. A suitable printing means for use in the illustrated embodiment is described in the previously cited Hauser reference.

Serving to provide a drum paper positioning signal for the illustrated circuit, a timing disc 34 is mounted on the axle of the drum 10 and rotates therewith. The timing disc 34 defines a plurality of spaced apertures 36 which, in the illustrated embodiment, are 215 in number. The drum 10 is rotated at a speed of approximately 44 milliseconds per revolution which provides an output signal frequency from the pulse generator 20 of approximately 5 killohertz. Correspondingly, the duration during which the paper flap 14 interrupts the flap sensor 16 is approximately 2 milliseconds and provides an output frequency rate of about 23 hertz. It will be appreciated that the specific frequencies and relative timing information is provided by way of example to facilitate understanding of the illustrated embodiment and that variations may be made in these frequencies and timing relationships without departing from the scope and spirit of this invention.

Increasing the frequency output from the pulse generator 20 by a factor of ten is a phase lock loop multiplier 38 of conventional circuit configuration well-known in the art. The 50 kilohertz output frequency from the phase lock loop 38 is fed to the sampling counter 18 which has a modulus of 2150 with selected output states $Q_o$ to $Q_{11}$ being fed to the decoder unit 22 via line 40. The counter 18 is reset by a low signal to its master reset input 42 which is provided by the output of a dual input AND-gate 44. One input of the gate 44 is fed by the direct output of a positive edge trigger type D counter control flip-flop 45. The direct output of the flip-flop is also connected to a reset input 46 of the modulus three validation counter 26. Driving the clock input 48 of the flip-flop 45 is the output of the flap sensor 16. Thus, it will be appreciated that each time the flap 14 of the paper 12 passes through the sensor 16, the leading edge of the positive going pulse from the sensor 16 may toggle the direct output of the flip-flop 45 high. This flip-flop is reset by means of the output of a triple input AND-gate 50, the inputs of which are fed by the decoder unit 22.

The decoder unit 22 includes four individual decoders 52, 54, 56, and 58 fed by selected output levels of the counter 18. Each decoder is responsive to selected output stages of the counter and provides a low output in response thereto. For example, when the count of the counter 18 reaches 32, decoder 52 will go low for one clock period and correspondingly the decoders 54, 56, and 58 will respectively go low at counts 64, 256 and 2048. The output of the 32 count decoder 52 is fed to the set input of a flap desired RS flip-flop 60 and the output of the decoder 54 is fed to one input of a dual input AND-gate 62, the remaining input of which is connected to the direct output of the counter control flip-flop 45. The output of the AND-gate 62 is fed to the reset input of the flip-flop 60. Thus, the output of the RS flip-flop 60 will be high during counter states 32 through 64 and reset to a low for the remaining portion of the counter 18 cycle. Similarly, the output of the decoder 256 is fed to the set input 64 of a flap absence RS flip-flop 66 and the output of the decoder 2048 is fed to one input of a dual input AND-gate 68, the output of which is fed to the reset input of the flip-flop 66. The alternate input of the AND-gate is connected to the direct output of the counter control flip-flop 45. The output of the flip-flop 66 correspondingly will go high during counter 18 states 256 through 2048. For purposes of subsequent consideration, it should be noted that states 2049 through 31 and states 65 through 255 each of which corresponds to approximately a 4 millisecond time duration are considered guard bands between the comparison periods as will subsequently be more fully appreciated. The digital comparator 24 serves to compare the outputs of the flip-flops 60 and 66, with the output of the flap sensor 16 thereby so as to determine whether the paper 12 is moving in unison with the drum 10 as indicated by the position of the flap 14. Serving to compare the flip-flop outputs with the output of the flap sensor 16 are two triple input NAND-gates 70 and 72. One input of each gate is fed by the complement output of the validation counter 26 via line 74. Whenever the complement output of the counter 26 goes low, the outputs of the gates 70 and 72 will remain high regardless of the signal levels at the remaining inputs. In this manner, once a valid paper condition is attained, the comparison operation terminates. One input of the NAND-gate 70 is fed by the direct output of the RS flip-flop 60 and one input of the NAND-gate 72 is fed by the direct output of the RS flip-flop 66. Additionally, the output of the flap sensor 16 is fed directly to the remaining input of the NAND-gate 72 and through an inverter 76 to the remaining input of the NAND-gate 70. The outputs of the NAND-gates 70 and 72 are fed to separate inputs of the triple input AND-gate the remaining input of which receives a start of message pulse which assures an initial reset of the counter control flip-flop 45. It will be appreciated that the logic function of the AND-gate 44 is such that when all inputs are high, the output is high and when any one of the inputs are low, the output is low. Correspondingly, the logic function of each of the NAND-gates 70 and 72 is such that when any one of the inputs are low, the output will be high and correspondingly, when all inputs are high, their outputs will be low. Thus the flip-flop 45 will be reset, holding the counters 18 and 26, whenever all of the inputs to any one of the NAND-gates 70 or 72 is high and it will be allowed to toggle whenever at least one input to any of the NAND-gates 70 or 72 is low. The output of the paper validation counter 26 is fed to the input of both NAND-gates and remains at a high level until the comparison counter 18 has completed three cycles. When the counter 18 reaches count 32, the output of the flip-flop 60 goes high, thus providing two high inputs to the NAND-gate 70. The third input to this NAND-gate is fed by the output of the inverter, which is fed from the output of the flap sensor 16. As previously mentioned, the sensor 16 is positioned so that the flap obstructs the sensor for approximately 2 milliseconds during each revolution which corresponds to a time period slightly greater than the 32 counter states during which the direct output of the RS flip-flop 60 is high. Therefore, when the paper 12 and drum 10 rotate in unison, the output of the RS flip-flop 60 goes high after the remaining input to the NAND-gate 70 from the output of the inverter 76 goes low thereby maintaining the NAND-gate in a continuous high state. Correspondingly, should the sensor 16 fail to detect the presence of the flap 14 during this portion of the counter cycle, the output of the AND-gate 50 will go low resetting the flip-flop 45 and the counters 18 and 26. Similarly, the output of the second RS flip-flop 66, which goes high during counts 256 through 2048 of the counter 18, is fed to the input of the NAND-gate 72. Whenever this input goes high, the paper 12, if it is rotating in unison with the drum 10, will be positioned with the flap 14 out of registration with the flap sensor 16. When the output of the RS flip-flop 66 goes high during counter 18 states 256 through 2048, the output from the flap sensor 16 will be low since the flap at that time should be out of registration with the sensor 16, and the output of the NAND-gate 72 remains high, preventing reset of the flip-flop 45. Correspondingly, should the sensor detect the flap 14 during this portion of the counter cycle, the output of the AND-gate 50 will go low resetting the flip-flop 45 and both counters 18 and 26. The comparator 24 effectively samples the presence of the flap at the sensor during two portions of the drum 10 rotation. The first sample being during that portion of a drum rotation corresponding to counts 32 through 64 of the counter. If the paper is securely wrapped about the drum, during this time period, the flap 14 will obstruct the sensor 16 and during that portion of the drum rotation corresponding to counts 256 through 2048 of the counter 18, the flap should be out of registration with the sensor. When such a condition exists, the counter control flip-flop 45 will not be reset by the output of the AND-gate 50 allowing both counters to advance. Should either of these conditions fail, the flip-flop 45 will reset both counters. These operational conditions will be more fully appreciated during the latter part of the description wherein reference is made to the timing diagrams illustrated.

When the paper rotates in unison with the drum, the counter 18 will continue to advance until an end of count (EOC) pulse is generated at output 78, momentarily resetting the counter 18 and advancing the validation counter 26. After three complete drum 10 revolutions without the flip-flop 45 having been reset, the validation counter 26 will reach its final state on the leading edge of the EOC pulse from the counter 18. The EOC pulse is fed through an inverter 80 to a paper validation AND-gate 82. Thus, the output of the AND-gate 82 goes high for the duration of the EOC pulse which is fed to the input of a delay circuit 83. The delay circuit 83 allows certain preliminary operations of the printer to be performed, such as initial positioning of the writing means 30, before actual printing starts. As previously mentioned, the printing operation is started only after the position of the paper with respect to the drum has been determined twice for each of three drum revolutions. That is, the flap must obstruct the sensor 16 during a first portion of the drum 10 revolution and must not obstruct the sensor 16 during a latter portion of the drum 10 revolution. After these preliminary operations have been completed, the output of the delay circuit 83 goes high, placing a high at one input of a print enable AND-gate 84, the remaining input of which is fed by a stop print signal from a count 1165 decoder 86. The decoder 86 is driven by selected output levels of the counter 18 and feeds a signal to the reset input 87 of a type "D" flip-flop 88. The flip-flop 88 is toggeled by a start print signal from a count 1172 decoder 90 which is addressed by selected output levels of the counter 18 via line 40. Thus, it will be appreciated that during the counter states "1165" through 1172 the D flip-flop 88 is reset. This particular counter period corresponds to the drum 10 position wherein the paper flap 14 is in registration with the printing means 30 and thus prevents printing over the flap 14. In this manner, the copy is centered on the paper with top of copy properly referenced to top of paper.

During the remainder of the counter 18 cycle, the direct output from the flip-flop 88 goes high which level is fed to one input of a dual input AND-gate 92. The remaining input of the AND-gate 92 is fed by the 50 kilohertz output of the phase lock loop 38. Therefore, when the flip-flop 88 output is high, the output of the AND-gate 92 will follow the output of the phase lock loop. This clock signal is fed to the output clock terminal 94 of the (FIFO) buffer 28. Informational data is clocked into the FIFO from an outside source via lines 96 and 98. Thus, information is clocked into the FIFO 28 at the incoming clock rate and out of the FIFO to the writing means 30 through amplifier 100 at a rate related to the rotational speed of the drum 10.

Operation

Figure 2:
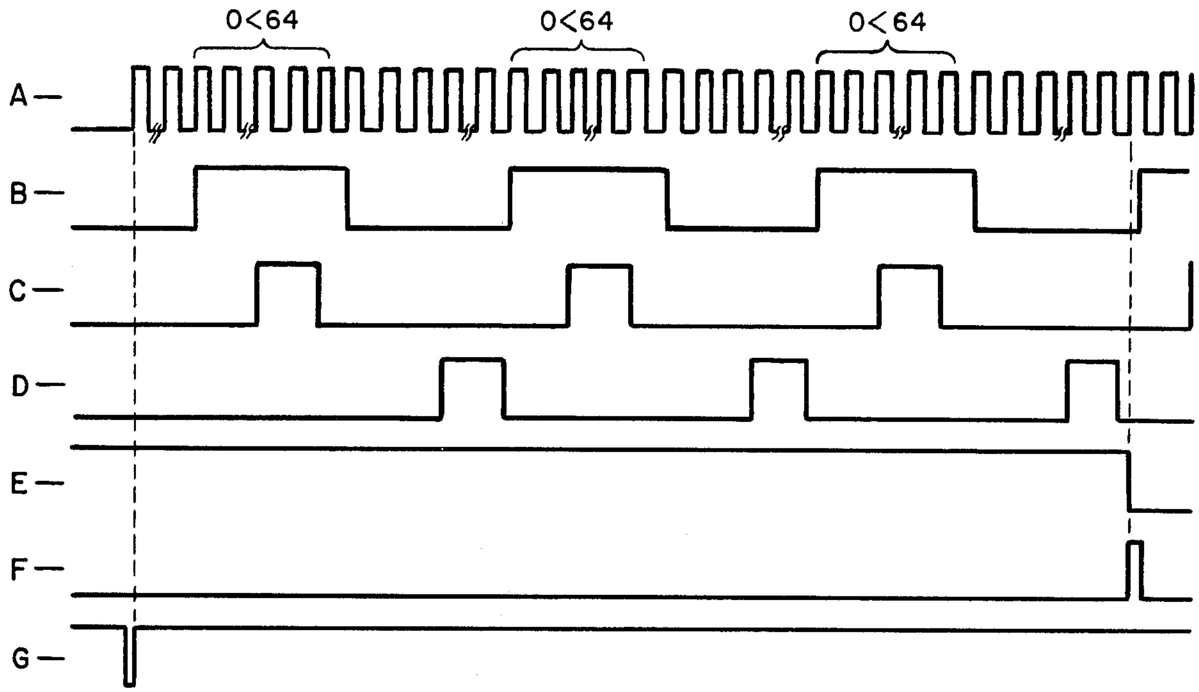
FIG. 2 is a timing diagram illustrating a first operational mode of the apparatus of FIG. 1.

With reference to FIG. 2, the timing diagrams therein illustrate the operation of the control circuit in response to the placement of a full sheet of paper onto the drum 10. In response to a start of message signal the drum starts rotating and a negative going pulse is fed to the input of AND-gate 50 via line 102. The pulse causes the output of gate 50 level G to go low momentarily assuring the flip-flop 45 will be in its reset state. The pulse train from the pulse generator 20 is multiplied by 10 and the output level A is fed to the counter 18 and AND-gate 92. For purposes of clarity, the frequency rate has been reduced in the illustration. The sensor output B is shown high from counter 18 states 0 to greater than 64 corresponding to the time during which the flap engages the sensor 16. The initial interruption of the flap sensor causes the flip-flop 45 direct output to go high, placing a high at the master reset 42 input of the counter 18 allowing the counter to advance. As illustrated in FIG. 2, during counts 32 to 64, the output C of the first comparison flip-flop will go high and with the paper properly positioned upon the drum, the output of the flap sensor is also high preventing reset of the flip-flop 45. As the counter progresses from counter states 256 through 2048, the output D of the sampling flip-flop 66 goes high which level is fed to the input of the NAND-gate 72. With the paper moving with the drum, the sensor 16 will not detect the flap 14 during this period and the alternate input from the sensor 16 to the NAND-gate will be low preventing reset of the flip-flop 45. Upon completion of the counter 18 cycle, the carry output resets the counter 18 and advances the modulus three counter 26. The process is repeated and the condition of the paper is sensed for a second counter 18 cycle. Upon completion of which the counter is again reset and the validation counter 26 advances to its second state. Finally, the position of the flap 14 with respect to the drum 10 is compared for a third time and upon completion of the counter 18 cycle the leading edge of the carry pulse at terminal 78 steps the counter 26 and the pulse passes through the paper validation AND-gate 82. The pulse passes through the gate 82 since the counter 26 has advanced to its third state with the direct output thereof going high. In response to the third carry pulse from the counter 18, the complement output of the modulus three counter level E goes low preventing any further resetting of the flip-flop 45 so that the counter 18 may continue to cycle irrespective of the signal levels. After the lapse of a predetermined interval the output of the delay 83 will go high and when state 1172 of counter 18 is reached, printing starts. Printing continues at a rate determined by the output of the phase lock loop 38 until the counter state 1165 arrives. At counter state 1165 printing is interrupted for seven counter states which corresponds to the paper position whereat the flap 14 is in registration with the printing means 30.

Figure 3:
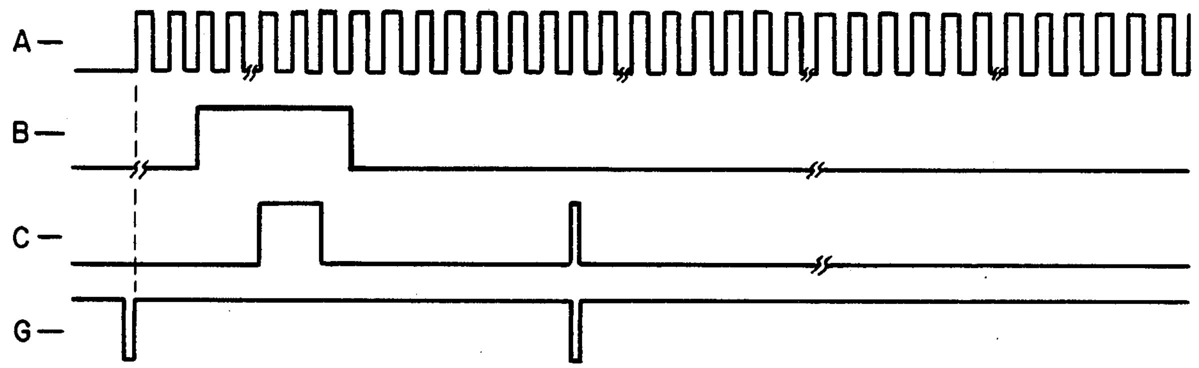
FIG. 3 is a timing diagram of the apparatus of FIG. 2 illustrating an alternate operational mode of the apparatus of FIG. 1.

The timing diagram of FIG. 3 illustrates the condition wherein a paper sheet has been positioned on the drum 10 and immediately removed by the operator. As the drum 10 rotates, the paper flap sensor 16 generates an output positive going signal level B, the leading edge of which triggers the flip-flop 45 and the counter 18 advances in response to the output of the phase lock loop 38. During the 32nd through the 64th counter states, level G will continue to remain high indicating a valid paper condition and during the second comparison period, corresponding to counter states, 256 through 2048, the output from the comparison flip-flop 66 will go high. However, since as previously mentioned, the paper has been removed by the operator, the flap sensor 16 during these counter states will sense the absence of a flap maintaining level G to the reset input of flip-flop 45 high. Upon completion of the first counter cycle, the validation counter 26 advances. During states 32 through 64 of the following counter 18 cycle, the output of the first comparison flip-flop 60 again goes high. However, since the flap sensor 16 output is now low as a result of paper removal, level G goes momentarily low, resetting the flip-flop. The initial negative going pulse of level G of FIG. 3 was in response to the start of message pulse to gate 50. Thus, the counter 18 and the validation counter 26 are reset. Thus, should the operator introduce the paper onto the drum and immediately remove it without allowing the paper to wrap around the drum, the illustrated circuit will accurately detect such a false paper condition.

Figure 4:
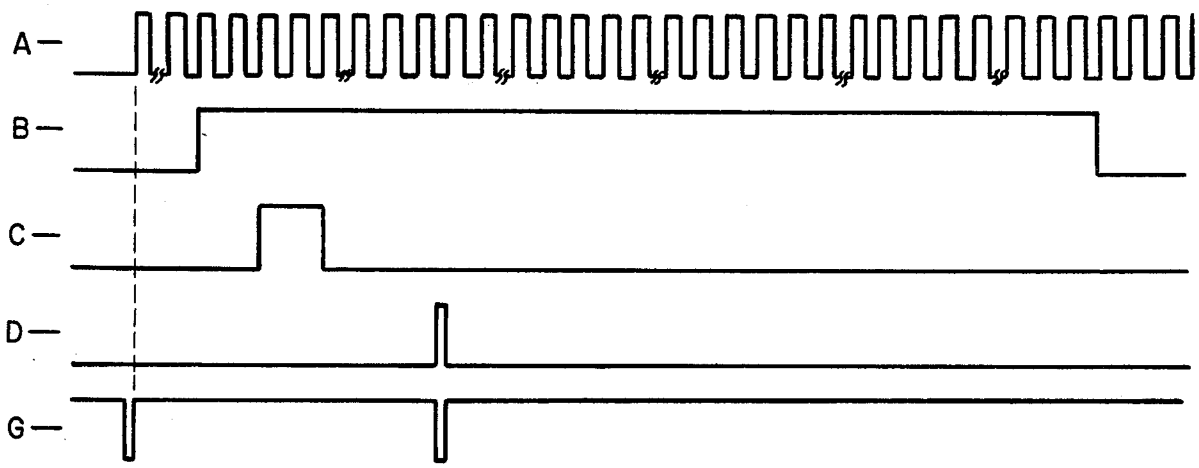
FIG. 4 is a third timing diagram of the apparatus of FIG. 1 illustrating a third alternative operational mode of the apparatus of FIG. 1.

The timing diagram of FIG. 4 illustrates a situation wherein paper is initially inserted on the drum 10 but held by the operator so as to prevent wrapping about the drum. Upon initial insertion, the paper flap will interrupt sensor 16 and the output line B goes high. The flip-flop 45 triggers enabling both the validation counter 26 and the revolution counter 18. During the first sampling period, flip-flop 60 output C goes high. During the second sampling period, corresponding to counter states 256 through 2048, an invalid sampling condition is present due to the continued engagement of the paper flap and the sensor 16. As a result, the output of the AND-gate 50, level G, goes low resetting the flip-flop 45 which instantaneously resets both the validation 26 and revolution 18 counters. This reset condition will remain so long as the flap sensor 16 senses the paper flap.

The illustrated circuit serves to enable the printing means 30 only when the paper rotates in unison with the drum 10 for three drum revolutions. It will be appreciated that the illustrated control circuit can be defeated if the operator manually inserts and removes the paper at the frequency rate of the counter. That is, the operator must insert the paper during counts 32 through 64 of counter 18 and remove the paper during the remaining counter states for three consecutive drum 10 revolutions. However, due to the high speed of the counter 18 and the inability of the operator to determine the condition of the counter, such an intentional false generation of a valid paper signal is extremely difficult if not impossible to obtain in practice. Thus, an apparatus has been described which provides a valid paper signal to the printer only when the paper has been properly positioned about the drum and is rotating in unison therewith. Although the invention has been particularly shown and described with reference to a preferred embodiment thereof, it will be understood that various changes in form and detail may be made without departing from the scope and spirit of the invention.

What is claimed is:

1. A control circuit for sensing the condition of a web wrapped about a rotating drum displaying an outer surface wherein the web carries a positional indicator comprising:

means fixed with respect to the axis of rotation of the drum for sensing the presence of said web indicator for each passage across a predetermined location and for generating an indicator signal in response thereto, means responsive to a selected one of said indicator signals for initiating the generation of a first series of positional signals, each signal corresponding to a subsequent predetermined rotational position of the indicator carried by the web; and first means for comparing the concurrance of at least one of said indicator signals with at least one of said positional signals so as to ascertain whether said web indicator has rotated a predetermined amount since said selected indicator signal.

2. The control circuit of claim 1 wherein said position signal generating means includes means for generating a second series of positional signals offset from said first series and corresponding to subsequent non-desired rotational positions of the indicator carried by the web; and second means for comparing the signal from said web indicator sensing means with at least one of said non-desired web position signals so as to ascertain the absence of said web indicator at said location.

3. The control circuit of claim 1 wherein said position signal generating means is in the form of a counter which starts in response to said selected indicator signal and means responsive to the rotation of said drum for advancing said counter through its successive states; and said first comparing means serving to compare selected states of said counter with the output of said position signal generating means.

4. The control circuit of claim 2 wherein said position signal generating means is in the form of a counter which starts in response to said selected indicator signal and means responsive to the rotation of said drum for advancing said counter through its successive states, each of said first position signals corresponding to at least one selected state of said counter and each of said second position signals corresponding to at least one alternate selected state of said counter.

5. The control circuit of claim 4 which further includes means for resetting said counter in response to the output of said first and second comparing means so that said counter is reset when said indicator is not in a predetermined position at the time of comparison and said counter advances so long as said web is in the predetermined positions at the time of comparison and said counter generates a web validation signal after a plurality sequential predetermined web indicator positions.

6. The control circuit of claim 3 which further includes means for resetting said counter in response to the output of said first comparing means so that said counter is reset when said indicator is not in a predetermined position whereby said counter advances so long as said web maintains its predetermined rotational positions, and said counter generates a web validation signal after a predetermined plurality of sequential predetermined web indicator positions.

7. The control circuit of claim 5 which further includes writing means responsive to said validation signal for placing a desired informational pattern upon said web, and means responsive to said counter for enabling said writing means only during selected counter conditions so as to prevent writing upon the web at a preselected location thereon.

8. The control circuit of claim 7 wherein said selective, writing enabling means disables said writing means during that position of the web whereat the writing means is directed at the web indicator so as to prevent writing thereon.

9. The control circuit of claim 8 which further includes a storage means feeding said writing means and receiving the information to be printed, the informational output rate from said storage means being clocked by said clock signal generating means during intervals determined by said counter.

10. A graphic printer control circuit for sensing the condition of a sheet of paper wrapped about a rotating cylindrical drum, the paper defining an exposed flap, the plane of said flap being substantially tangent to the surface of the drum, comprising:

means fixed with respect to the axis of the drum for sensing the presence of the paper flap and generating a distinct signal for each passage thereby, a counter and means responsive to a selected one of said flap sensing signals for enabling said counter in response thereto, means responsive to the movement of the drum for generating a plurality of clocking signals, said clocking signals serving to advance the counter to successive states thereof, first means for comparing the occurrence of at least one of said flap signals with a preselected state of said counter so as to ascertain whether said paper has rotated with the drum a predetermined amount since said selected flap signal, and means for resetting said counter in the absence of a comparison.

11. The control circuit of claim 10 which further includes second means for comparing the output of said flap sensor with a second state of said counter, said counter reset means resetting said counter in response to an affirmative comparison by said second comparing means.

12. The control circuit of claim 11 wherein said counter provides a paper validation signal in response to a plurality of valid comparisons by said first and second comparators indicating a desired continual rotational relationship between the paper and the drum, and a writing mechanism for placing a desired pattern upon the paper, said writing mechanism being enabled in response to said validation signal.

13. The control circuit of claim 12 which further includes means responsive to at least one selected counter state for disabling said writing means when said writing means is directed at the paper flap so as to prevent the placement of information upon the paper flap.

14. The control circuit of claim 12 which further includes means responsive to said validation signal for disabling said counter reset means and means responsive to at least one selected counter state for disabling said writing means when said writing means is directed at the paper flap so as to prevent the placement of information upon the paper flap.

15. The control circuit of claim 11 which further includes a storage means feeding said writing means and receiving the information to be printed, the information output rate from said storage means being determined by said clock signal generating means during intervals determined by said counter.

16. A method for controlling the writing of information upon a paper disposed upon a rotating drum the plane of the flap of the paper being tangential to the surface of the drum comprising the steps of:

sensing the presence of the flap at a selected location for each rotation of the drum, generating a signal corresponding to a subsequent anticipated predetermined position of the flap, and comparing subsequent positions of the flap as determined by said flap sensing step with the signal corresponding to its anticipated predetermined position so as to ascertain the presence of a desired rotational relationship between the paper and the drum.

17. The method of claim 15 wherein the step of comparing is a two-fold operation of comparing a subsequent position of the flap with an expected predetermined flap position and the absence of the flap at a predetermined position.

18. The method of claim 16 wherein the relative position of the flap and the drum are compared for several drum revolutions and initiating a printing operation upon the paper after the paper and the drum are rotating in the predetermined relationship for several drum revolutions.

19. The method of claim 17 which further includes the step of maintaining a nonprint margin upon the paper at the initial location of the flap and independent of subsequent flap detections so as to assure proper registration of the printed information upon the paper obtaining a straight first print line.

* * * * *